US 9,293,161 B1
Mar. 22, 2016

United States Patent
Taniguchi et al.

(54) IRON-OXIDIZED HARD DISK DRIVE ENCLOSURE COVER

(71) Applicant: HGST Netherlands B.V., Amsterdam (NL)

(72) Inventors: Yuki Taniguchi, Fujisawa (JP); Kazushi Tsuwako, Machida (JP); Koichi Suzuki, Fujisawa (JP); Masahiko Tamura, Ayase (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/932,221

(22) Filed: Nov. 4, 2015

Related U.S. Application Data

(63) Continuation of application No. 14/588,838, filed on Jan. 2, 2015, now Pat. No. 9,202,483.

(51) Int. Cl.
*G11B 5/39* (2006.01)

(52) U.S. Cl.
CPC ........................................ *G11B 5/39* (2013.01)

(58) Field of Classification Search
CPC ...... G11B 25/043; G11B 33/08; G11B 21/12; G11B 21/22; G11B 5/6005; G11B 5/4806; G11B 5/4813; G11B 17/038
USPC ...................................................... 360/97.11
See application file for complete search history.

(56) References Cited

U.S. PATENT DOCUMENTS

| 6,023,392 | A | 2/2000 | Kim |
| 6,407,880 | B1 | 6/2002 | Gillis et al. |
| 8,111,478 | B2 | 2/2012 | Shen |
| 8,149,535 | B2 | 4/2012 | Li et al. |
| 8,564,900 | B2 | 10/2013 | Hirono et al. |
| 2006/0187577 | A1 | 8/2006 | Ser et al. |
| 2009/0244769 | A1 | 10/2009 | Dai et al. |
| 2011/0122567 | A1 | 5/2011 | Cheah et al. |

OTHER PUBLICATIONS

Fujitsu Limited, "Fujitsu Develops Lubricant Technology to Prevent Corrosion of Hard Disk Drives", Dec. 6, 2001, 2 pages, downloaded from: http://pr.fujitsu.com/en/news/2001/12/6-3.html on Jul. 8, 2014.
R. Wang; "Enhanced Reliability of Hard Disk Drive by Vapor Corrosion Inhibitor", Magnetics Conference, 2006, Intermag 2006, IEEE International, May 8-12, 2006, p. 414, IEEE, San Diego, CA.

*Primary Examiner* — Mark Blouin
(74) *Attorney, Agent, or Firm* — John D. Henkhaus

(57) ABSTRACT

An iron-oxidized hard disk drive (HDD) cover has an inner surface that is substantially free of un-oxidized or pure metallic iron, fabricated by baking a stainless steel cover and thereby oxidizing the cover surface of iron. Because the cover is iron-oxidized, a costly nickel-plating process may be foregone while a "Fe smear" problem may be significantly reduced. Such an iron-oxidized cover is especially beneficial for, though not limited to, use as an inner cover in a sealed HDD.

20 Claims, 3 Drawing Sheets

BAKE A STAINLESS STEEL COVER PART TO FULLY
OXIDIZE IRON ON THE SURFACE OF THE COVER PART
202

FIG. 2

IRON-OXIDIZED HARD DISK DRIVE ENCLOSURE COVER

CROSS-REFERENCE TO RELATED APPLICATIONS

This application is a continuation of and claims the benefit of priority to commonly-owned pending U.S. patent application Ser. No. 14/588,838 filed on Jan. 2, 2015, the entire contents of which are incorporated by reference for all purposes as if fully set forth herein.

FIELD OF EMBODIMENTS

Embodiments of the invention may relate generally to hard disk drives and more particularly to an iron-oxidized cover for prevention or reduction of iron contamination.

BACKGROUND

A hard-disk drive (HDD) is a non-volatile storage device that is housed in a protective enclosure and stores digitally encoded data on one or more circular disk having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Some HDDs employ a stainless steel cover, in conjunction with a base, to form the HDD enclosure. Steel is composed primarily of iron with some amount of carbon. Thus, stainless steel is a steel alloy composed of steel, i.e., iron, with a certain amount of chromium. Stainless steel does not readily corrode and oxidize (i.e., rust), as compared to ordinary steel, and therefore is often a reasonable choice for an HDD cover. However, stainless steel is not corrosion-proof or rust-proof and thus there is a phenomenon in HDD technology referred to as "Fe smear" or "iron smear". With Fe smear, iron contamination migrates from the cover, for example, to the slider and/or disk which in turn can causes weak write operations. Weak write operations are at some degree considered an HDD failure, which has a direct effect on the reliability of the drive. Therefore, there are challenges associated with inhibiting Fe smear in HDDs.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward an iron-oxidized hard disk drive (HDD) cover, a hard disk drive comprising such a cover, and associated methods for manufacturing such a cover. An iron-oxidized HDD cover according to embodiments comprises an inner surface that is substantially free of un-oxidized, or "pure", metallic iron. According to embodiments, the iron-oxidized cover is manufactured by baking a stainless steel cover, thereby oxidizing the cover surface of iron. For example and according to an embodiment, the iron oxide concentration on the surface of the cover may be at least about ten times the chromium oxide concentration. Consequently, because the cover is iron-oxidized a relatively expensive nickel-plating process may be foregone while the Fe smear problem may be significantly reduced. Furthermore, such an iron-oxidized cover is especially beneficial for, though not limited to, use as an inner cover in a sealed HDD.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 2 is a diagram illustrating a method for manufacturing a hard disk drive cover, according to an embodiment.

DETAILED DESCRIPTION

Approaches to an iron-oxidized hard disk drive cover to inhibit iron contamination are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Embodiments may be used for, but are not limited to, an enclosure cover for a hard-disk drive (HDD) storage device. Thus, in accordance with an embodiment, a plan view illustrating an HDD 100 is shown in FIG. 1 to illustrate an exemplary operating environment.

Figure 1:
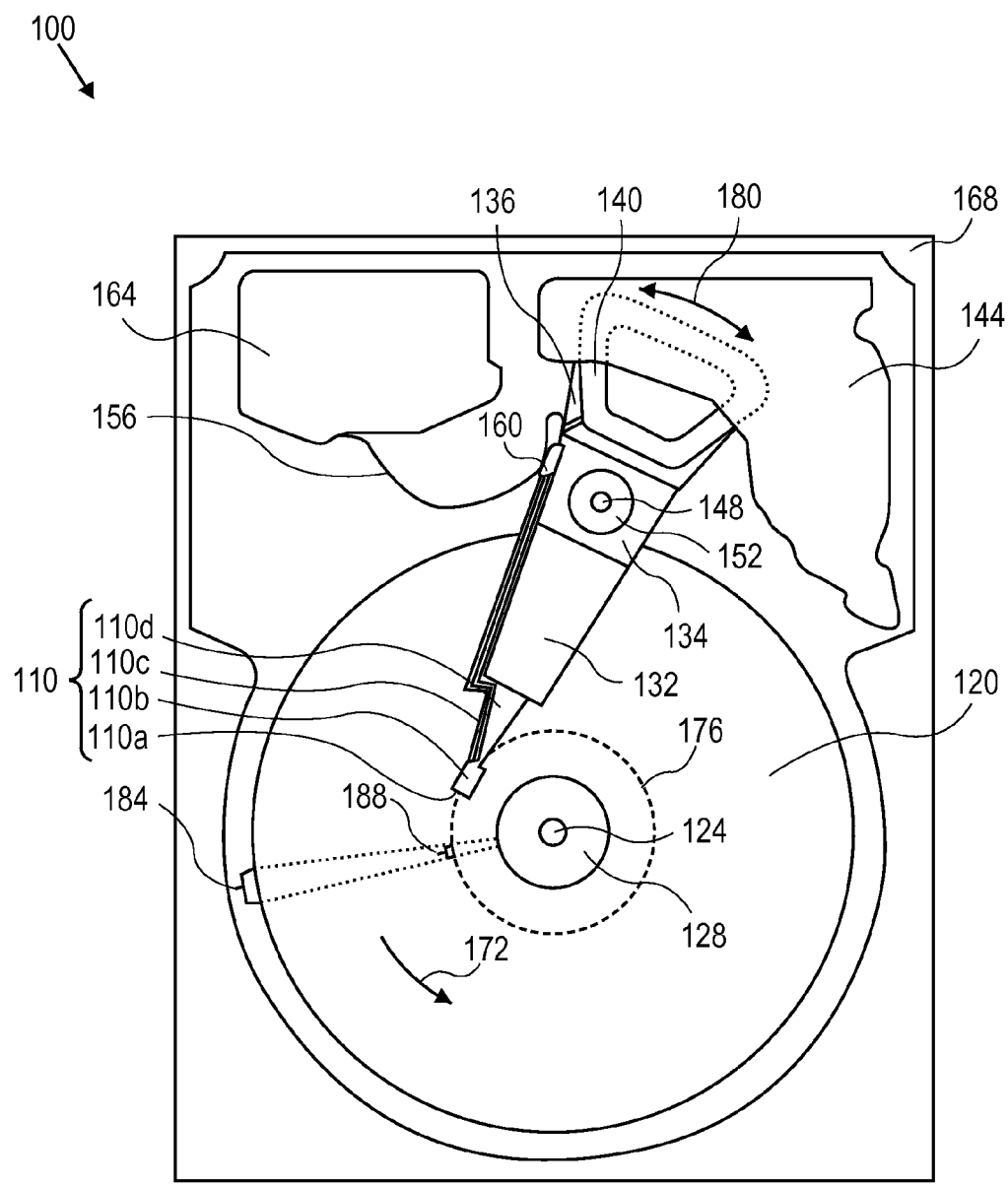
FIG. 1 is a plan view illustrating a hard disk drive, according to an embodiment.

FIG. 1 illustrates the functional arrangement of components of the HDD 100 including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a 124 and a drive motor (not visible) attached to the spindle 124 for rotating the medium 120. The head 110a includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

As mentioned, some hard disk drives (HDDs) employ a stainless steel cover, in conjunction with a base, to form the HDD enclosure. However, use of stainless steel can cause iron (Fe) contamination ("Fe smear") within the HDD. Such iron contamination is especially problematic in sealed HDDs, in which the integrity of the surface of the stainless steel cover is degraded when stored in such an oxygen-depleted environment. One possible approach to preventing the iron contamination problem could be to nickel (Ni) plate the cover. However, nickel-plating is a relatively costly process within HDD manufacturing and, therefore, not ideal.

Method of Manufacturing a Hard Disk Drive Cover

FIG. 2 is a diagram illustrating a method for manufacturing a hard disk drive cover, according to an embodiment. FIG. 2 characterizes a single step process, thus a single block is illustrated.

At block 202, a stainless steel HDD cover part is baked in order to fully oxidize the iron on the surface of the cover part. Being stainless steel, the surface of an unbaked cover part in original form contains "pure" metallic iron (Fe), i.e., un-oxidized iron. By contrast, the surface of the baked cover part no longer contains pure metallic iron but now contains only, or primarily, oxidized iron. To "fully oxidize" is intended to encompass the possibility that some remnants of metallic iron (Fe) may still exist on the cover, therefore, a "substantially fully oxidized" cover part by way of baking is contemplated. Any and all oxidation of the pure metallic iron leads to a scenario in which the problem of Fe smear is significantly diminished if not outright eliminated. Furthermore, the expensive nickel-plating process can be avoided if the process of FIG. 2 is implemented, where such a baking process would typically be considerably less costly than the nickel-plating process. Thus, according to an embodiment, the stainless steel cover part is not nickel-plated.

As discussed, stainless steel contains some amount of chromium. Furthermore, untreated or unbaked stainless steel parts would typically contain iron and chromium oxides (e.g., due to atmospheric oxidation) in addition to the pure metal forms of iron and chromium on their surface. Both of the metallic iron and metallic chromium are oxidized by the baking procedure, but the overall end amount of iron oxide increases while the overall end amount of chromium oxide decreases by baking. Thus, according to an embodiment, the baking procedure referred to at block 202 is such that the iron oxide concentration on the surface of the cover part is at least about ten (10) times the chromium oxide concentration. A goal of achieving an iron oxide concentration to chromium oxide concentration of over ten (10) times is contemplated and found to be achievable.

For guidance, but as non-limiting examples, the surface of one unbaked sample contained around 69% iron oxide, 21% chromium oxide, and 3% iron metal (with the remainder being some nickel, manganese, and chromium metal), with an iron oxide-to-chromium oxide ratio of about 3.3. After baking at 200° C. for around 3 hours, the sample contained around 85% iron oxide, 11% chromium oxide, and 0% iron metal (with the remainder being some manganese), with an iron oxide-to-chromium oxide ratio of about 7.9. With a similar unbaked sample, after baking at 250° C. for around 2 hours, the sample contained around 93% iron oxide, 5% chromium oxide, and 0% iron metal (with the remainder being some manganese), with an iron oxide-to-chromium oxide ratio of about 18. Furthermore, a baking temperature of at least around 230° C. may provide appropriate levels of iron oxidation, such as leaving iron oxide-to-chromium oxide ratios greater than around 10.

A number of approaches may be used to detect the presence of, or in this case the absence of, metallic iron on the surface of the cover part. For a non-limiting example, an XPS (X-ray Photoelectron Spectroscopy) method may be used.

Iron-Oxidized HDD Cover

Implementation of the method of manufacturing a hard disk drive (HDD) cover as illustrated in FIG. 2 is likely to result in an iron-oxidized cover for an HDD, according to an embodiment, where at least the inner surface of the cover is substantially free of un-oxidized iron (i.e., pure metallic Fe).

As discussed, iron contamination such as "Fe smear" is especially problematic in sealed HDDs, in which the integrity of the surface of the stainless steel cover is degraded when stored in such an oxygen-depleted environment. In particular, it is likely that the top disk and the uppermost slider and corresponding read/write head are particularly afflicted with Fe smear due at least in part to their close proximity to the top cover part.

HDDs are being manufactured which are hermetically sealed with helium inside. Further, other gases that are lighter than air have been contemplated for use as a replacement for air in sealed HDDs. For example, with helium having roughly one-seventh the density of air, sealing an HDD with helium significantly reduces the turbulence within the drive caused by the spinning disk(s), reduces power consumption and results in a lower temperature within the HDD.

Figure 3:
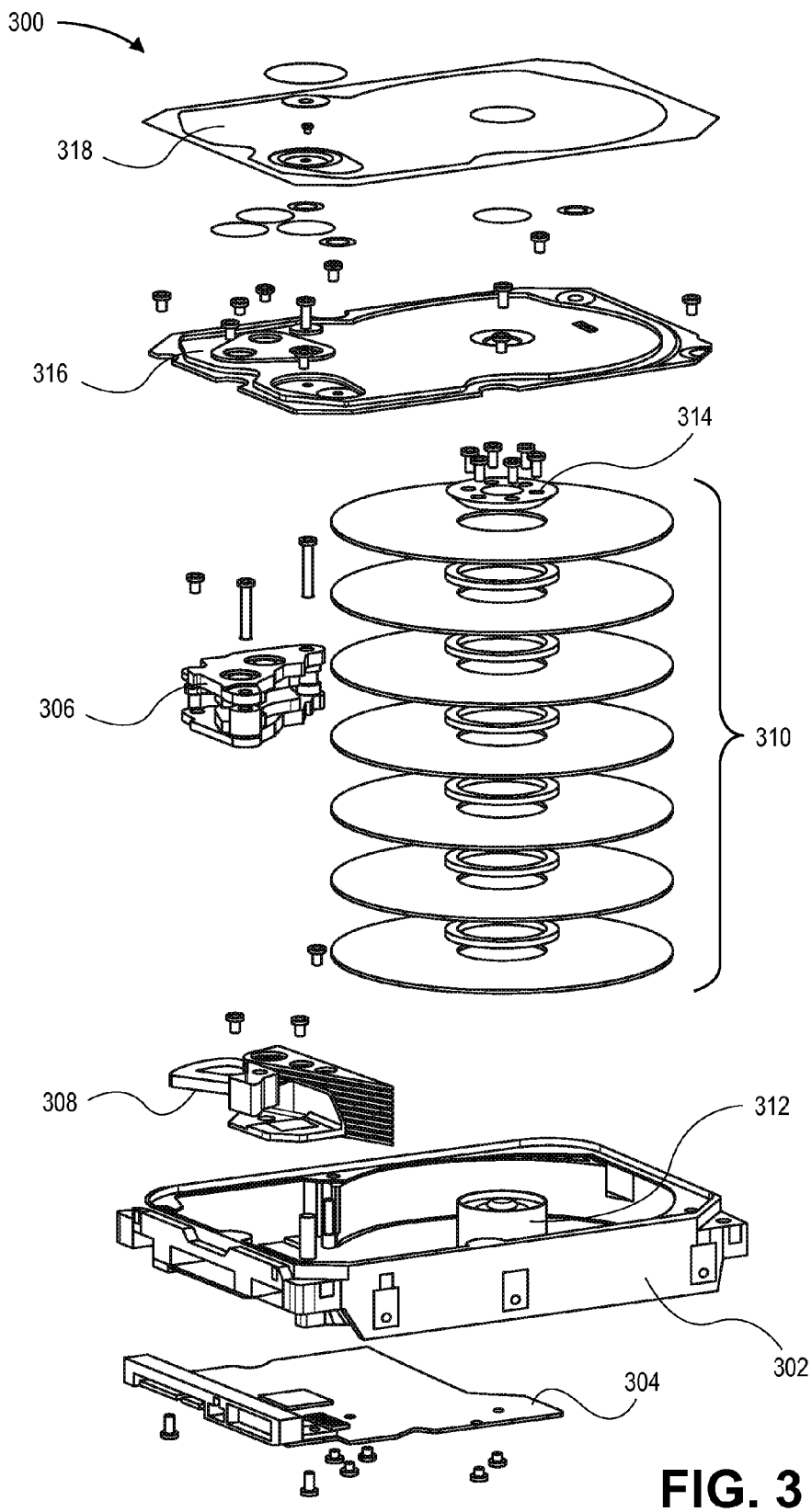
FIG. 3 is an exploded view illustrating a sealed hard disk drive, according to an embodiment.

Based on the foregoing, embodiments are especially suited for, but not limited to, use with a sealed HDD. FIG. 3 is an exploded view illustrating a sealed hard disk drive, according to an embodiment.

Sealed hard disk drive (HDD) 300, described in a simplified form, comprises a base 302 to which an electronic circuit board 304 is affixed, and an actuator 306 such as a voice coil motor (VCM) for actuating the movement of a head-stack assembly (HSA) 308, including a head slider, over certain locations of one or more disk of a disk stack 310, which is mounted on a spindle of a spindle motor 312 by way of a disk clamp 314. The foregoing components may be similar in function to like components described in reference to FIG. 1 and, along with other components, are enclosed in an enclosure comprising a first cover 316 attached to the base 302. According to an embodiment, first cover 316 is implemented as an iron-oxidized cover part as described herein, such as in reference to FIG. 2, which is a baked stainless steel part that is substantially free of un-oxidized iron.

With further reference to FIG. 3, according to an embodiment sealed HDD 300 comprises a second cover 318 positioned over and/or affixed to the first cover 316 to form a hermetically sealed enclosure. For a non-limiting example, the second cover 318 may be sealed onto the first cover 316 of the enclosure, or onto the base, using an adhesive. Thus, sealed HDD 300 may be filled with a gas lighter than air according to an embodiment, and may be filled with helium according to a related embodiment. Note that there may be other technologies associated with hermetically sealing an HDD enclosure to maintain the supply of a relatively low density gas such as helium within the HDD, such as use of various filters, fasteners, adhesives, seals, and the like. Therefore, the manner in which a sealed drive is hermetically sealed may vary from implementation to implementation.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive comprising:
   a base;
   at least one disk medium rotatably mounted on a spindle;
   a head slider comprising a read/write head configured to read from and to write to said disk medium;
   a voice coil actuator configured to move said head slider to access portions of said disk medium; and
   a pre-oxidized cover coupled with said base to form an enclosure for said disk medium, said head slider, and said voice coil actuator, wherein a surface of said pre-oxidized cover is substantially free of un-oxidized metallic iron, and wherein said enclosure is substantially filled with a gas that is lighter than air.

2. The hard disk drive of claim 1, wherein an iron oxide concentration on said surface of said pre-oxidized cover is at least about ten times a chromium oxide concentration of said surface of said pre-oxidized cover.

3. The hard disk drive of claim 1, wherein said pre-oxidized cover is composed of baked stainless steel.

4. The hard disk drive of claim 1, wherein said pre-oxidized cover is not nickel-plated.

5. The hard disk drive of claim 1, wherein said pre-oxidized cover is a first cover, said hard disk drive further comprising:
   a second cover affixed to said first cover to form a hermetically sealed enclosure.

6. The hard disk drive of claim 1, wherein said pre-oxidized cover is a first cover, said hard disk drive further comprising:
   a second cover affixed to said base to form a hermetically sealed enclosure.

7. The hard disk drive of claim 1, wherein said enclosure is substantially filled with a predominantly helium gas.

8. The hard disk drive of claim 1, wherein said surface of said pre-oxidized cover being substantially free of un-oxidized metallic iron inhibits metallic iron contamination from migrating from said surface to said disk medium and said head slider.

9. A hard disk drive comprising:
   a base;
   at least one disk medium rotatably mounted on a spindle;
   a head slider comprising a read/write head configured to read from and to write to said disk medium;
   a voice coil actuator configured to move said head slider to access portions of said disk medium; and
   a pre-oxidized cover coupled with said base to form an enclosure for said disk medium, said head slider, and said voice coil actuator, wherein a surface of said pre-oxidized cover contains pre-oxidized iron that was formed by baking said cover.

10. The hard disk drive of claim 9, wherein said surface of said pre-oxidized cover contains pre-oxidized iron that was formed by baking said cover prior to being coupled with said base.

11. The hard disk drive of claim 9, wherein said enclosure is substantially filled with a predominantly helium gas.

12. A hard disk drive comprising:
    a base;
    at least one disk medium rotatably mounted on a spindle;
    a head slider comprising a read/write head configured to read from and to write to said disk medium;
    a voice coil actuator configured to move said head slider to access portions of said disk medium; and
    a pre-oxidized cover coupled with said base to form an enclosure for said disk medium, said head slider, and said voice coil actuator, wherein a surface of said pre-oxidized cover contains pre-oxidized iron that was formed by baking said cover, and wherein said enclosure is substantially filled with a gas that is lighter than air.

13. The hard disk drive of claim 12, wherein said enclosure is substantially filled with a predominantly helium gas.

14. The hard disk drive of claim 12, wherein said enclosure encloses an oxygen-depleted environment.

15. An iron-oxidized cover for a hard disk drive enclosure, said cover comprising: an inner surface substantially free of un-oxidized iron.

16. The iron-oxidized cover of claim 15, wherein said inner surface comprises a baked surface from which iron migration is inhibited.

17. The iron-oxidized cover of claim 15, wherein said iron-oxidized cover is composed of baked stainless steel.

18. The iron-oxidized cover of claim 15, wherein said iron-oxidized cover is not nickel-plated.

19. A method of manufacturing a cover for a hard disk drive, the method comprising: baking a stainless steel cover part to substantially fully oxidize iron on a surface of said cover part to inhibit migration of iron from said surface.

20. The method of claim 19, wherein said baking includes baking such that an iron oxide concentration on said surface is at least about 10 times a chromium oxide concentration on said surface.

* * * * *

UNITED STATES PATENT AND TRADEMARK OFFICE
CERTIFICATE OF CORRECTION

| | | |
|---|---|---|
| PATENT NO. | : 9,293,161 B1 | |
| APPLICATION NO. | : 14/932221 | |
| DATED | : March 22, 2016 | |
| INVENTOR(S) | : Taniguchi et al. | |

It is certified that error appears in the above-identified patent and that said Letters Patent is hereby corrected as shown below:

In the Claims

Column 7, beginning on line 24, replace the text "a chromium oxide concentration of said surface" with "a chromium oxide concentration on said surface".

Signed and Sealed this
Thirty-first Day of May, 2016

Michelle K. Lee
*Director of the United States Patent and Trademark Office*